United States Patent
Felt

[15] 3,653,672
[45] Apr. 4, 1972

[54] SEAL RING

[72] Inventor: Maurice D. Felt, Carson City, Nev.
[73] Assignee: Sacomo Sierra Inc.
[22] Filed: July 13, 1970
[21] Appl. No.: 54,464

[52] U.S. Cl. ......................................... 277/205, 277/212 C
[51] Int. Cl. ........................................................ F16j 15/24
[58] Field of Search .................. 277/165, 205, 208, 212 RC, 277/207, 209

[56] References Cited

FOREIGN PATENTS OR APPLICATIONS 12,424  5/1902  Great Britain ......................... 277/165
343,277 10/1921  Germany ............................... 277/205

*Primary Examiner*—Robert I. Smith
*Attorney*—Eckhoff and Hoppe

[57] ABSTRACT

A seal ring is provided having rounded lips wherein the top point of sealing is below the top of the ring and the ring has a large area in contact with the sealing surface. The seal ring may have a hollow center portion or a filler strip may be employed in the center of the ring. The filler strip, if used, is of rectangular configuration.

4 Claims, 5 Drawing Figures

INVENTOR.
MAURICE D. FELT
BY
ATTORNEY

SEAL RING

SUMMARY OF THE INVENTION

"U" Ring Type flexible seals are for use in sealing dynamic and static hydraulic or gas applications for prevention of internal and external leakage. U seals are pressure energized with pressure against the open end of the "U" acting equally on the inner surface in all directions, statically balancing the seal. U seals are normally assembled with an interference fit allowing a positive, relatively low, initial compression. U Ring type seals provide good sealing with low friction at low to moderate pressures, however, as pressure increases frictional wear the the heel — or extrusion of the heel — are quite likely to be accelerated with subsequent failure of the sealing lips(s).

It is an object of the present invention to provide a configuration that will maintain a longer wearing seal at low and accelerated pressures without premature failure of the sealing lips and the lips, with their bulk in the rounded leading edge, will also maintain their seal as the base or heel of the cup wears or extrudes into the clearance gap between the piston and cylinder wall or the clearance gap between the rod and stuffing box gland. Tests have verified that as the heel wears and/or extrudes the configuration of this invention will cause the upper portion of the sealing lips to lower proportionately as the heel material is lost without failing by tearing, fracturing or flop over, retaining an adequate ability to seal the pressure medium, substantially reducing the potential possibility of failure.

The sealing ring of the present invention has a number of advantages over sealing rings heretofore known. The sealing ring has rounded lips wherein the point of contact between the ring and the wall being sealed is well below the top of the ring. The rounded leading edges are also helpful during installation allowing the rings to be installed without special tools and lessening the possibility of nicking or cutting the lips. This is a design consideration only.

Most of the initial wear on a "U" cup is on the heel of the cup. As the heel wears it can allow the thinner walls of the lips to fracture or blow by and turn. The heel can also extrude into the clearance gap (when clearance is excessive or pressures high) between the piston and cylinder wall or rod and stuffing box gland. When this happens the lip can turn back or fracture. Extrusion or cold flow is minimized in the design of the present invention.

The rounded leading edges of the ring of the present invention seal effectively at low pressures with normal interference. At high pressures a very effective seal is maintained and with the unique design of the wedge shaped lips the seal can be maintained even with severe wear and extrusion of the heel portion of the cup.

Under extremely severe pressures, shock loads, poor surface finishes, etc, the performance can be even further enhanced by adding more bulk to the heel of the cup, i.e., making the overall height greater than the nominal cross section but leaving the design of the lips the same as in the standard square cup. This will give more wear surface to the heel, reduce the tendency to extrude and prevent modification of the stress distribution to the lips of the cup.

U type seals frequently use a "filler" strip or ring enclosed in the interior or protruding slightly above the lips of the "U". These strips are normally composed of a material lower in durometer or hardness than the material of the seal. This filler strip acts as a "spring" to further increase the initial contact or interference fit of the lips of the seal at installation and to prevent the bypass of fluid or gas at low pressures as the cup wears during operation. Some materials used in the manufacture of cups are homogenous in nature without fabric reinforcement and tend to flow or "remold" under the heat and pressure generated during use. Under this condition they do not retain the "interference" originally built in and required to maintain a seal at lower pressures. Use of a filler strip is advantageous for this condition and the present invention uses a rectangular filler of cork and Buna-N or an elastomeric material such as Buna-N or Neoprene. This filler strip is slightly below the top of the cup lips and is held in place by the wedge formed by the inward taper of the opposing lips of the seal.

In the past, some filler strips have been used in the form of O rings and these tend to be extruded from the cup under certain conditions while the ring of the present invention uses a rectangular or wedge shaped filler strip which locks in place. The rectangular filler strip causes a very sensitive seal at low pressures or when tolerances are excessive. The filler strips also prevents the seal from bypassing fluid when the cup is overheated in use and then cooled. As the cup wears, the sealing strip also aids in retaining the seal.

Some prior art sealing rings also have required the special provision of an undercut in the heel to permit stacking when multiple rings are employed. The design of the present ring is such that a flat heel may be used without interfering with stacking, thus adding to the strength of the ring.

Other features of the present invention will be apparent from the balance of the specification.

DESCRIPTION OF THE PREFERRED EMBODIMENTS

Figure 1:
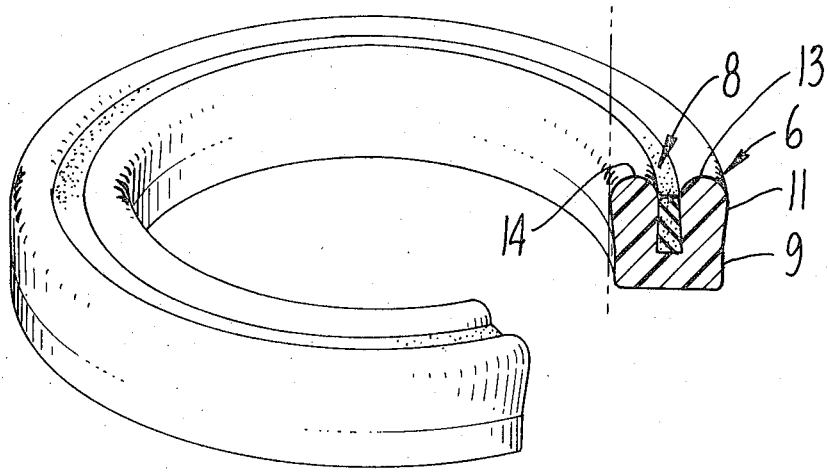
FIG. 1 is a perspective view of a sealing ring embodying the present invention, partly in section.

Referring now to the drawings by reference characters, there is shown in FIG. 1 a packing or sealing ring generally designated 6 having a filler strip generally designated 8. The sealing ring 6 can be made of any suitable resilient material as is well known to those skilled in the art such as polyester or polyether castable urethane compounds, preferably having a relatively high Shore A durometer range, such as 90 to 95. Other elastomeric compounds may be used such as neoprene, natural rubber or a synthetic rubber such as Buna-N. Reinforcing materials such as duck and similar fabrics may or may not be used. One particularly suitable material consists of a polyurethane resin impregnated with molybdenum disulfide. The filler strip 8 can be either a compressible material such as cork and Buna-N rubber or a relatively non-compressible material such as neoprene or Buna-N rubber. Obviously many other suitable materials for both the ring proper and the filler strip will suggest themselves to those skilled in the art.

Describing the ring now in detail, the ring has a base portion 9 and shoulders 11, the base extending generally from the line designated A to the line designated B and the shoulders extending from line B to line C. Such rings are ordinarily designed for a nominal clearance i.e., the expected clearance between two parts to be sealed, such as between a piston and a cylinder wall and/or "Rod and Stuffing Box", and this dimension is hereinafter referred to as "nominal". In the embodiment illustrated, the distance from A to C, i.e., the overall height of the ring was equal to nominal. The top of the shoulder 11 is rounded as at 13 and the combined width of the shoulders extends from the line D to the line E and is slightly larger than nominal, in this case it being 1.08 times nominal. The base 9 which extends between the lines F and G is ordinarily slightly smaller than nominal and in this case was 97 percent of the nominal. The shoulders 11 extend upwardly from a root 15 and the width of this root is about one-fourth of nominal and the root depth is about two-thirds nominal. The inner walls of the shoulders as at 17 taper inwardly slightly, while the outer wall of shoulders 11 taper outwardly. Both tapers start substantially from the line B. The shoulders 11 have top portions 13 and 14 and these are curved substantially through 180° as is shown. The radius of the curve is shown by the arrow H and this radius is about one-fifth nominal.

Figure 3:
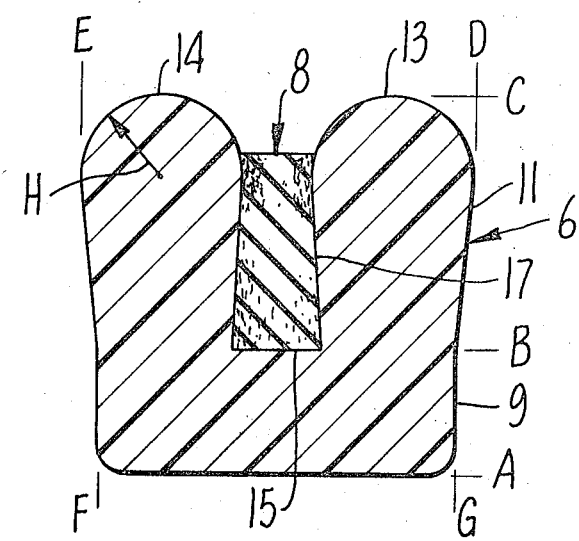
FIG. 3 is an enlarged cross section of the sealing ring of FIG. 1.

In the embodiment shown in FIGS. 1 and 3 a filler 8 is provided and this is in the form of a rectangular insert. As was previously pointed out the filler can be made from either compressible or non-compressible material and the filler permits more sensitive sealing at low pressure or when tolerances are excessive. The filler also prevents the seal from bypassing fluid when the cup is overheated and then cooled. Since the inner walls of the shoulders taper inwardly, the filler will be grasped and held by the shoulders with the top of the filler somewhat compressed.

Figure 2:
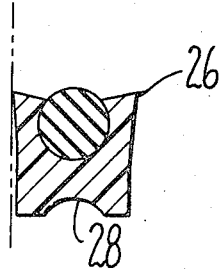
FIG. 2 is a section of a prior art sealing ring.
Figure 4:
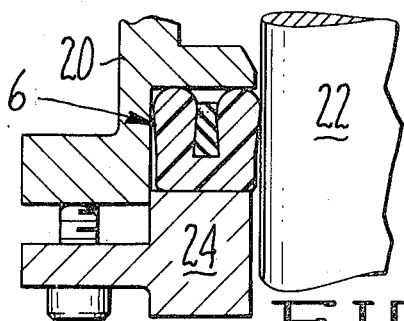
FIG. 4 is a sectional view showing the sealing ring of the present invention in use.

In FIG. 4 the ring is shown in position and in this illustration, it is sealing between a stuffing box 20 and a rod 22 and held in place by a retaining ring 24. It will be seen that the initial point of contact between the ring 6 and the shaft 22 is far below the top of the ring and is about midway on the shoulder where the curved top portion of the shoulder joins the flat side wall portion. If pressure is increased on such a ring, it tends to flatten out, increasing the area of contact of the seal, greatly reducing chances of a blowout. Contrast this with the prior art structure shown in FIG. 2. Here it is seen that the initial point of sealing is at 26 which is the top point of the shoulder. As pressure is increased, the ring will flatten against the wall but at still higher pressures the heel will wear or extrude allowing the thin walls of the lip to fracture or blow by and turn.

Since the O ring which is employed extends above the top of the ring, it is necessary that the base portion be recessed as at 28 to enable a plurality of rings to be stacked. In contrast, the ring of the present invention can be used singly or multiply and the base is flat as is shown, giving maximum strength.

Figure 5:
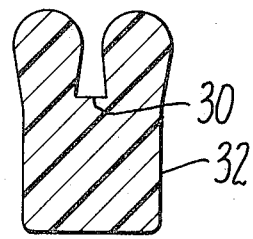
FIG. 5 is a section through a sealing ring of that embodiment of the invention wherein no filler strip is employed.

In FIG. 5, a modification of the present invention is shown wherein the filler ring has been eliminated and the base portion, i.e., that portion below the root of the groove has been greatly enlarged. The root of the groove is shown at 30 and this leaves a base portion 32 of approximately two-thirds of the overall height of the sealing ring.

Although various embodiments of the invention have been illustrated, wide variations can be made in the exact dimensions shown without departing from the spirit of this invention. In one embodiment of the invention, the base was shown to be about one-third of the height of the ring while another embodiment was shown to be about two-thirds of the height of the ring. Obviously, base heights between these extremes can be employed as well as greater base height, e.g., as much as two times nominal.

I claim:

1. A sealing ring having a cross sectional configuration consisting of a generally rectangular base and two shoulders extending generally upwardly from said base, said shoulders having a space between them extending upwardly from a root, the inner surfaces of said shoulders tapering inwardly whereby a filler member may be retained between said shoulders, the outer surfaces of said shoulders tapering outwardly from the level of the root and the upper surfaces of said shoulders being symetrically rounded 180° whereby said shoulder will contact a wall being sealed on said shoulder at a point below the top of said shoulder.

2. The structure of claim 1 wherein the tops of said shoulders are rounded through about 180°, the curve having a radius of about one-fifth the thickness of the ring.

3. The structure of claim 1 wherein the base portion of the ring is from about ⅓ to ⅔ of the total height of the ring.

4. The structure of claim 1 wherein a filler member is provided in said groove, said filler member being of rectangular cross section and having a top surface below the top surface of said ring.

* * * * *